(No Model.)
J. W. CULMER.
BUTTER WORKING TRAY.
No. 418,277. Patented Dec. 31, 1889.
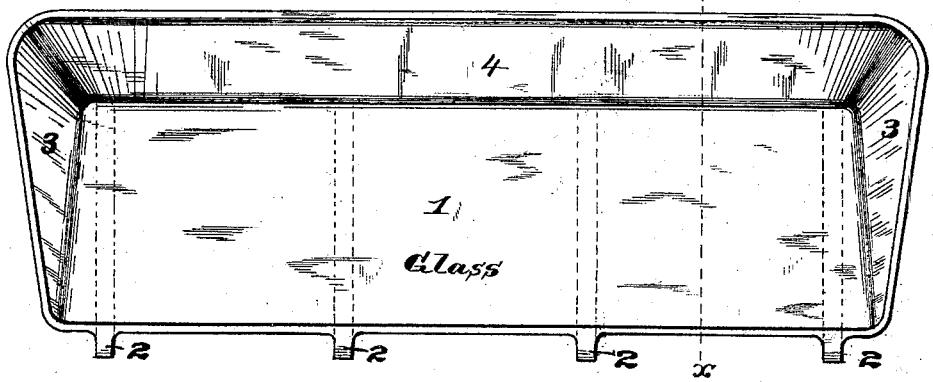
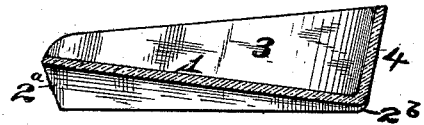
Witnesses:
H. B. Moulton
F. R. Cornwall
Inventor:
John W. Culmer
by F. W. Ritter Jr.
Atty

UNITED STATES PATENT OFFICE.

JOHN W. CULMER, OF NEW BRIGHTON, ASSIGNOR OF ONE-HALF TO WILLIAM A. McCOOL, OF BEAVER FALLS, PENNSYLVANIA.

BUTTER-WORKING TRAY.

SPECIFICATION forming part of Letters Patent No. 418,277, dated December 31, 1889.

Application filed April 11, 1889. Serial No. 306,878. (No model.)

*To all whom it may concern:*

Be it known that I, JOHN W. CULMER, a citizen of the United States, residing in the borough of New Brighton, county of Beaver, and State of Pennsylvania, have invented certain new and useful Improvements in Butter-Working Trays; and I hereby declare the following to be a full, clear, and exact description of the same, reference being had to the accompanying drawings, in which—

Figure 1 is a perspective view of the tray for holding the butter while working the same. Fig. 2 is a transverse section on the line $x\ x$, Fig. 1.

Like symbols refer to like parts wherever they occur.

My invention relates to the construction of a butter-working tray, such as is commonly employed in manipulating the butter after it is removed from the churn to work out or express therefrom the fluids, buttermilk, water, &c., and has for its object to provide an inexpensive, efficient, and readily-cleansed tray of general utility, though more especially adapted for domestic use.

The domestic tray commonly, and perhaps universally, used for working butter has heretofore consisted of a wooden bowl or tray, and a serious objection thereto has been the absorbent nature of the material, which rendered the tray difficult to cleanse thoroughly, so that a taint or odor would not attach thereto and increase with age and use.

To obtain the objects I have in view and avoid the objections set forth, I construct my improved butter-working tray of a non-absorbent vitreous-surfaced material that can be readily and perfectly cleansed, and the material I prefer therefor is glass, because it is comparatively inexpensive and readily shaped. The tray or holder, when made of glass or like frangible material, will of course be heavier and less readily handled and turned than the usual wooden bowl now employed, and I therefore prefer to form the same with an inclined bed or bottom to facilitate the draining of the butter and with back and side walls to hold the water, buttermilk, &c., until intentionally discharged by tilting the tray.

I will now proceed to describe more specifically the preferred form of the tray, so that others may apply the invention.

In the drawings, Figures 1 and 2 represent the tray, which I form with a plain inclined bottom or platform 1, supported by a series of ribs 2 on the under surface thereof, said ribs of a greater depth at the front $2^a$ than at the rear $2^b$, thus giving the desired inclination to the bottom 1, and at the same time securing strength with less material—consequently less weight—which is a desirable feature where the article is to be of a vitreous and frangible nature. The front or higher part of said platform 1 is left open to facilitate the working of the butter; but the sides and back of platform or table 1 are guarded by vertical flanges or walls 3 3 and 4, respectively, of sufficient height to prevent splashing of the milk or water or the escape of the butter during manipulation. This tray may be formed of earthenware provided with an enameled or vitreous surface, or, which I much prefer, may be molded of glass and annealed in the usual manner.

The advantages incident to my improved butter-working tray are cleanliness and cheapness, as well as peculiar adaptability to use in working small masses of butter, as in case of domestic or home manufacture.

Having thus described my invention, what I claim, and desire to secure by Letters Patent, is—

A tray for butter-working, said tray composed of non-absorbent vitreous-faced material and having an inclined bottom provided with supporting-ribs on its under surface and on its upper surface with side walls and a wall at the bottom of the incline, said walls being integral with the inclined bottom, substantially as and for the purposes specified.

In testimony whereof I affix my signature, in presence of two witnesses, this 9th day of April, 1889.

JNO. W. CULMER.

Witnesses:
J. B. WALLACE,
ARTHUR WATTS.